US012350666B2

(12) United States Patent
Kourai et al.

(10) Patent No.: US 12,350,666 B2
(45) Date of Patent: Jul. 8, 2025

(54) CHEMICAL ANALYSIS APPARATUS

(71) Applicant: Hitachi High-Tech Corporation, Tokyo (JP)

(72) Inventors: Yuusuke Kourai, Tokyo (JP); Toshiyuki Inabe, Tokyo (JP); Shunsuke Miyamoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 681 days.

(21) Appl. No.: 17/778,326

(22) PCT Filed: Nov. 5, 2020

(86) PCT No.: PCT/JP2020/041344
§ 371 (c)(1),
(2) Date: May 19, 2022

(87) PCT Pub. No.: WO2021/111795
PCT Pub. Date: Jun. 10, 2021

(65) Prior Publication Data
US 2022/0410152 A1    Dec. 29, 2022

(30) Foreign Application Priority Data

Dec. 3, 2019    (JP) .................................. 2019-218793

(51) Int. Cl.
B01L 3/00    (2006.01)
G01N 1/38    (2006.01)
G01N 35/02    (2006.01)

(52) U.S. Cl.
CPC .......... B01L 3/502715 (2013.01); G01N 1/38 (2013.01); B01L 2300/0663 (2013.01); B01L 2400/0439 (2013.01); G01N 35/025 (2013.01)

(58) Field of Classification Search
CPC ....... B01L 3/502715; B01L 2300/0663; B01L 2400/0439; G01N 1/38; G01N 35/025;
(Continued)

(56) References Cited

U.S. PATENT DOCUMENTS 7,687,039 B2 *    3/2010    Laugharn, Jr. ........ B01F 33/408
366/127
2009/0120188 A1    5/2009    Misu
(Continued)

FOREIGN PATENT DOCUMENTS

JP    2001-188070 A    7/2001
JP    2008-20197 A    1/2008
(Continued)

OTHER PUBLICATIONS

International Search Report (PCT/ISA/210) issued in PCT Application No. PCT/JP2020/041344 dated Jan. 19, 2021 with English translation (four (4) pages).
(Continued)

Primary Examiner — Brian J. Sines
(74) Attorney, Agent, or Firm — Crowell & Moring LLP

(57) ABSTRACT

The present invention provides a chemical analyzer with highly reliable agitation performance, said chemical analyzer not only diagnosing the deterioration of a piezoelectric element, but also diagnosing the deformation and displacement of a reaction container and diagnosing the normality of the liquid quantity of a substance to be agitated in the reaction container. This chemical analyzer is characterized by comprising: an agitating mechanism that uses acoustic waves to agitate a sample and a reagent within a reaction container, generates acoustic waves using a piezoelectric element, and has an acoustic wave sensor for detecting the acoustic waves; and a controller that controls the agitating mechanism. Said chemical analyzer is further characterized (Continued)

in that the controller has: an acoustic wave detection unit that processes a detection signal detected by the acoustic wave sensor; a normality information memory in which normal-time information is stored; a signal intensity determination unit that compares the acoustic wave amplitude and acoustic wave frequency transmitted from the acoustic wave detection unit with the acoustic wave amplitude and acoustic wave frequency stored in the normality information memory; and a repeat period determination unit that compares the acoustic wave period characteristic transmitted from the acoustic wave detection unit with the acoustic wave period characteristic stored in the normality information memory.

6 Claims, 17 Drawing Sheets

(58) Field of Classification Search
CPC .... G01N 2035/00554; G01N 35/00623; B01F 31/87; B01F 31/89
See application file for complete search history.

(56) References Cited

U.S. PATENT DOCUMENTS

| 2010/0112704 A1 | 5/2010 | Tsuda |
| 2014/0147348 A1* | 5/2014 | Katou ............... G01N 35/025 |
| | | 422/509 |

FOREIGN PATENT DOCUMENTS

| JP | 2008-268079 A | 11/2008 |
| JP | 2015-25678 A | 2/2015 |
| JP | 2016-45026 A | 4/2016 |
| WO | WO 2009/011314 A1 | 1/2009 |

OTHER PUBLICATIONS

Japanese-language Written Opinion (PCT/ISA/237) issued in PCT Application No. PCT/JP2020/041344 dated Jan. 19, 2021 (three (3) pages).

* cited by examiner

FIG. 11

|  |  | STIRRING STATE | COMPARE TRANSMISSION WAVE INFORMATION | COMPARE RECEPTION WAVE INFORMATION | FAILURE MODE |
|---|---|---|---|---|---|
| NORMAL | (A) | — | T=TT | R=RR | — |
| ABNORMAL | (B1) | OUTPUT DROP | T-A≠TT-A | — | DETERIORATION OF PIEZOELECTRIC ELEMENT |
|  | (B2) | FREQUENCY SHIFT | T-F≠TT-F | — | DETERIORATION OF PIEZOELECTRIC ELEMENT |
|  | (C) | CHANGE IN PROPAGATION TIME | — | t≠tt | DEFORMATION OR POSITIONAL DISPLACEMENT OF REACTION VESSEL |
|  | (D1) | INCREASE | — | R<RR | INCREASE IN LIQUID AMOUNT |
|  | (D2) | DECREASE | — | R>RR | DECREASE IN LIQUID AMOUNT |

CHEMICAL ANALYSIS APPARATUS

TECHNICAL FIELD

The present invention relates to a chemical analysis apparatus.

BACKGROUND ART

In analysis in the fields of chemistry, medicine, and the like, an object to be stirred of a sample and a reagent has become minute in amount. There is a case where the sample and the reagent are stirred and mixed by irradiation with ultrasonic.

A background art of this technical field includes JP 2015-25678 A (PTL 1). PTL 1 describes an automatic analyzer in which, in an agitation operation before analysis or during analysis, a control unit compares a set value of the strength of an ultrasonic wave generated from a piezoelectric element set by a storage unit for the fluidity of the object to be agitated in a reaction vessel, and a detected value of the strength of the ultrasonic wave detected by a detection unit, thereby determining as to whether the ultrasonic wave was radiated from the piezoelectric element onto the object to be agitated in the reaction vessel under an appropriate condition (see Abstract).

CITATION LIST

Patent Literature

PTL 1: JP 2015-25678 A

SUMMARY OF INVENTION

Technical Problem

PTL 1 describes an automatic analyzer that determines as to whether the ultrasonic wave was radiated from the piezoelectric element under an appropriate condition.

However, PTL 1 describes an automatic analyzer (chemical analysis apparatus) that determines whether an ultrasonic irradiation condition is appropriate, but does not describe implementation of diagnosis of deterioration of the piezoelectric element, diagnosis of deformation or positional displacement of a reaction vessel, and diagnosis of normality of a liquid amount of an object to be stirred in the reaction vessel.

Therefore, the present invention provides a chemical analysis apparatus that achieves not only diagnosis of deterioration of a piezoelectric element but also diagnosis of deformation or positional displacement of a reaction vessel and diagnosis of normality of a liquid amount of an object to be stirred in the reaction vessel, and has high reliability of stirring performance.

Solution to Problem

In order to solve the above problems, a chemical analysis apparatus of the present invention includes: a stirring mechanism that stirs a sample and a reagent using an acoustic wave in a reaction vessel, generates the acoustic wave by a piezoelectric element, and includes an acoustic wave sensor that detects the acoustic wave; and a controller that controls the stirring mechanism, in which the controller includes: an acoustic wave detection unit that processes a detection signal detected by the acoustic wave sensor; a normal information memory that stores normal time information; a signal strength determination unit that compares an amplitude of an acoustic wave and a frequency of an acoustic wave transmitted from the acoustic wave detection unit with an amplitude of an acoustic wave and a frequency of an acoustic wave stored in the normal information memory; and a repetition cycle determination unit that compares a cycle characteristic of an acoustic wave transmitted from the acoustic wave detection unit with a cycle characteristic of an acoustic wave stored in the normal information memory.

The chemical analysis apparatus of the present invention further includes a deterioration determination unit that determines deterioration of the piezoelectric element and normality of the reaction vessel based on a comparison result in the signal strength determination unit and a comparison result in the repetition cycle determination unit.

Advantageous Effects of Invention

According to the present invention, it is possible to provide a chemical analysis apparatus that achieves not only diagnosis of deterioration of a piezoelectric element but also diagnosis of deformation or positional displacement of a reaction vessel and diagnosis of normality of a liquid amount of an object to be stirred in the reaction vessel, and has high reliability of stirring performance.

Note that the above-described problems, configurations, and effects will be made clear by the description of the following embodiment.

BRIEF DESCRIPTION OF DRAWINGS

FIG. 11 is a diagnosis table for diagnosing deterioration of the piezoelectric element and normality of the reaction vessel 102 described in the first embodiment.

DESCRIPTION OF EMBODIMENTS

An embodiment of the present invention will be described below with reference to the drawings. Note that substantially the same or similar configurations are denoted by the same reference signs, and when descriptions overlap, the description thereof may be omitted.

First Embodiment

First, an overall apparatus configuration of a chemical analysis apparatus described in a first embodiment will be explained.

Figure 1:
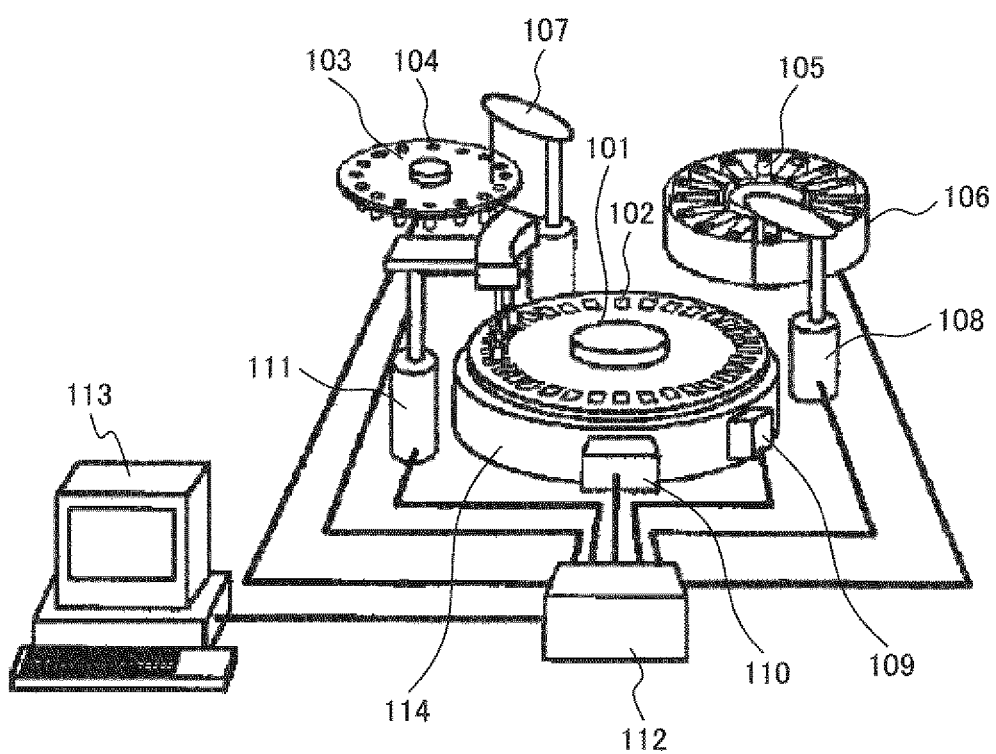
FIG. 1 is an explanatory diagram explaining an overall apparatus configuration of a chemical analysis apparatus described in a first embodiment.

FIG. 1 is an explanatory diagram explaining an overall apparatus configuration of the chemical analysis apparatus described in the first embodiment.

The chemical analysis apparatus includes: a reaction disk 101 that stores the reaction vessel 102; a constant temperature tank 114 that retains a constant temperature state of the reaction vessel 102 stored in the reaction disk 101; a sample turntable 103 that stores a sample cup 104; a reagent turntable 106 that stores a reagent bottle 105; a sample dispensing mechanism 107 that dispenses a sample into the reaction vessel 102; a reagent dispensing mechanism 108 that dispenses a reagent into the reaction vessel 102; the stirring mechanism 109 that stirs a dispensed sample and a dispensed reagent in the reaction vessel 102; a photometric mechanism 110 that measures absorbance of an object to be stirred (hereinafter, referred to as specimen) in the reaction vessel 102 during and/or after reaction; and a cleaning mechanism 111 that cleans the reaction vessel 102 after measurement is finished.

The chemical analysis apparatus includes a controller 112 that controls the sample turntable 103, the reagent turntable 106, the sample dispensing mechanism 107, the reagent dispensing mechanism 108, the stirring mechanism 109, the photometric mechanism 110, and the cleaning mechanism 111, and a console 113 as an input/output apparatus.

The chemical analysis apparatus operates as follows.

(1) The sample dispensing mechanism 107 dispenses the sample from the sample cup 104 to the reaction vessel 102.

(2) The reaction disk 101 storing the reaction vessel 102 into which the sample has been dispensed rotates to a reagent dispensing position.

(3) The reagent dispensing mechanism 108 dispenses a reagent from the reagent bottle 106 to the reaction vessel 102 into which the sample has been dispensed.

(4) The reaction disk 101 storing the reaction vessel 102 into which a sample and a reagent have been dispensed rotates to a stirring position.

(5) The stirring mechanism 109 stirs (hereinafter, mixing may also be included) the sample and the reagent in the reaction vessel 102.

(6) The reaction disk 101 storing the reaction vessel 102 in which stirring has been finished rotates to a measurement position of absorbance.

(7) The photometric mechanism 110 measures the absorbance of a specimen during and/or after reaction between the sample and the reagent.

(8) The reaction disk 101 storing the reaction vessel 102 in which measurement has been finished rotates to a cleaning position.

(9) The cleaning mechanism 111 sucks the specimen in the reaction vessel 102 in which measurement has been finished, and cleans the reaction vessel 102.

Note that the timing of the series of these operations and the rotation of the reaction disk 101 is controlled by the controller 112, and the series of these operations are executed exhaustively in a batch processing manner for a plurality of samples.

Before analysis is executed, information such as an analysis item, a sample amount, and a reagent amount is input from the console 113 in advance. Then, the controller 112 automatically creates an analysis program and operates based on this analysis program.

A detection signal (reception waveform) detected by the acoustic wave sensor 213 (see FIG. 2) is processed by the controller 112 (signal unit 214 (see FIG. 2)), and the console 113 displays the processed result.

Next, the stirring mechanism 109 described in the first embodiment will be explained.

Figure 2:
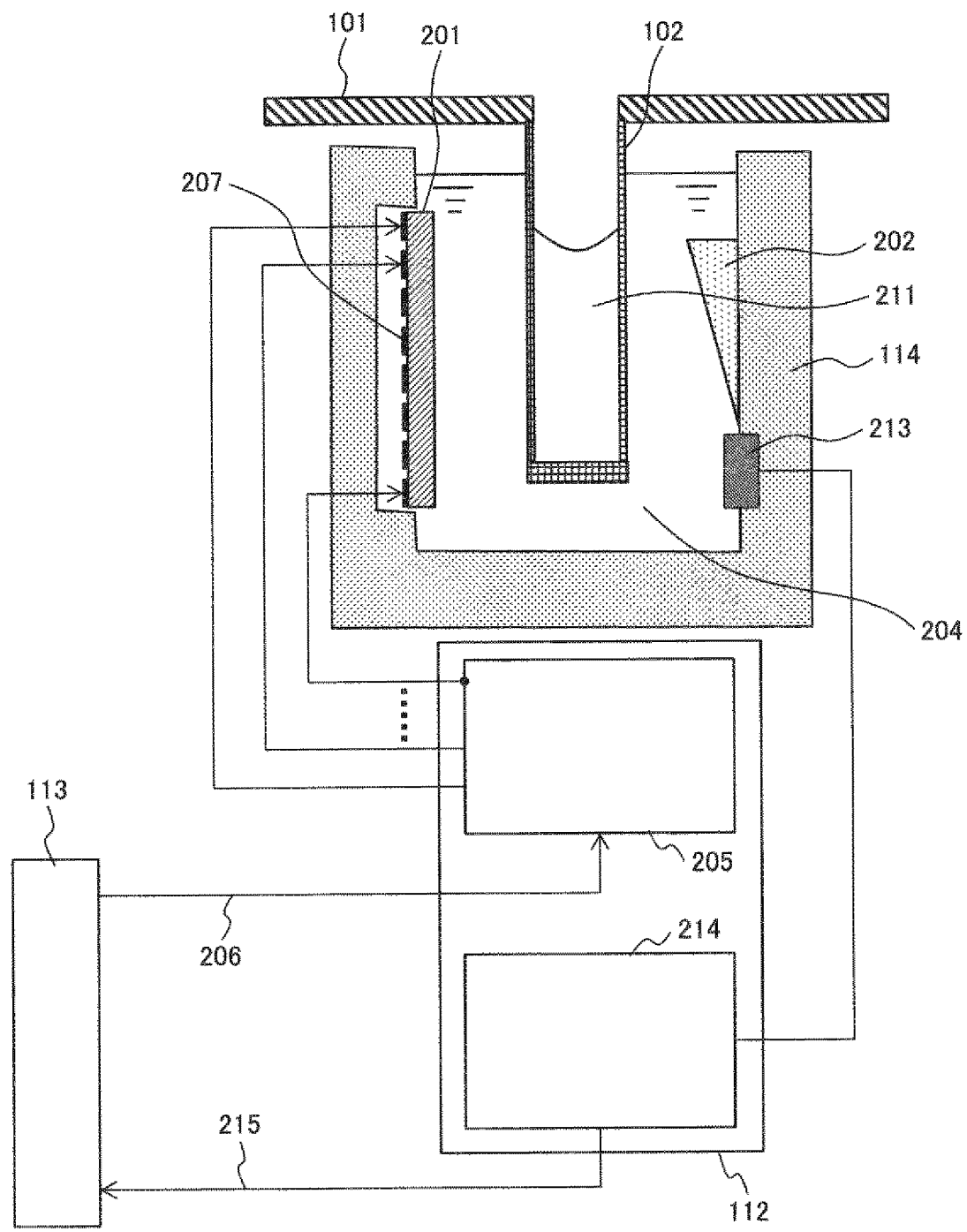
FIG. 2 is a cross-sectional view explaining a stirring mechanism 109 described in the first embodiment.

FIG. 2 is a cross-sectional view explaining the stirring mechanism 109 described in the first embodiment.

The constant temperature tank 114 is filled with constant temperature water 204, and the reaction vessel 102 is installed so as to be immersed in the constant temperature water 204. A specimen 211 is injected into the reaction vessel 102.

The stirring mechanism 109 includes the acoustic wave generation unit 201 installed on an inner wall (e.g., an inner peripheral side of the inner wall) of the constant temperature tank 114, an acoustic wave reflection unit 202 installed on the inner wall (e.g., an outer peripheral side of the inner wall) of the constant temperature tank 114, and the acoustic wave sensor 213 installed below the acoustic wave reflection unit 202.

The acoustic wave generated from the acoustic wave generation unit 201 propagates through the constant temperature water 204, the reaction vessel 102 is irradiated with the acoustic wave from a side surface of the reaction vessel 102, the specimen 211 injected into the reaction vessel 102 is stirred, and the sample and the reagent are mixed. The acoustic wave is preferably an ultrasonic wave.

In general, when an acoustic wave propagating through a liquid reaches a free liquid surface, the liquid is acted upon by a force to splash out into a gas. Acoustic radiation pressure is the main factor. Therefore, the acoustic wave generated from the acoustic wave generation unit 201 is irradiated downward (in a direction without the liquid surface) relative to the liquid surface of the specimen 211 injected into the reaction vessel 102.

The acoustic wave generated from the acoustic wave generation unit 201 is reflected by the acoustic wave reflection unit 202, propagates through the constant temperature water 204, the reaction vessel 102 is irradiated with acoustic wave from a side surface of the reaction vessel 102, the specimen 211 injected into the reaction vessel 102 is stirred, and the sample and the reagent are mixed.

The acoustic wave reflection unit 202 has an inclination so as to reflect downward the acoustic wave generated from the acoustic wave generation unit 201. Due to this, the acoustic wave, which is reflected by the acoustic wave reflection unit 202 and with which the reaction vessel 102 is irradiated, is irradiated downward (in a direction without liquid surface).

Thus, the stirring mechanism 109 stirs the specimen 211 in a non-contact manner.

The acoustic wave generation unit 201 is installed in an array in the up-down direction (vertical direction), and includes segments 207 each driven independently. The segment 207 has a piezoelectric material between electrodes, includes a piezoelectric element, and generates an acoustic wave. The acoustic wave generation unit 201 is preferably an ultrasonic element.

That is, on the side surfaces of the constant temperature tank 114 facing each other, the stirring mechanism 109 includes the acoustic wave generation unit 201 that generates an acoustic wave and the acoustic wave reflection unit 202 that reflects the acoustic wave. Then, the reaction vessel 102 is installed between the acoustic wave generation unit 201 and the acoustic wave reflection unit 202.

The acoustic wave sensor 213 detects an acoustic wave that passes through the reaction vessel 102 from the acoustic wave generation unit 201, the acoustic wave including (1) an acoustic wave that directly propagates, (2) an acoustic wave that propagates via the acoustic wave reflection unit 202, and (3) an acoustic wave that reflects on a gas-liquid interface of the reaction vessel 102 and propagates. The acoustic wave sensor 213 senses a propagating acoustic wave as a pressure change and converts it into an electric signal (detection signal).

The controller 112 includes the drive unit 205 that controls drive of the acoustic wave generation unit 201, and the signal unit 214 that processes a detection signal detected by the acoustic wave sensor 213. The drive unit 205 receives information 206 from the console 113 and the signal unit 214 transmits information 215 to the console 113.

Next, the drive unit 205 described in the first embodiment will be explained.

Figure 3:
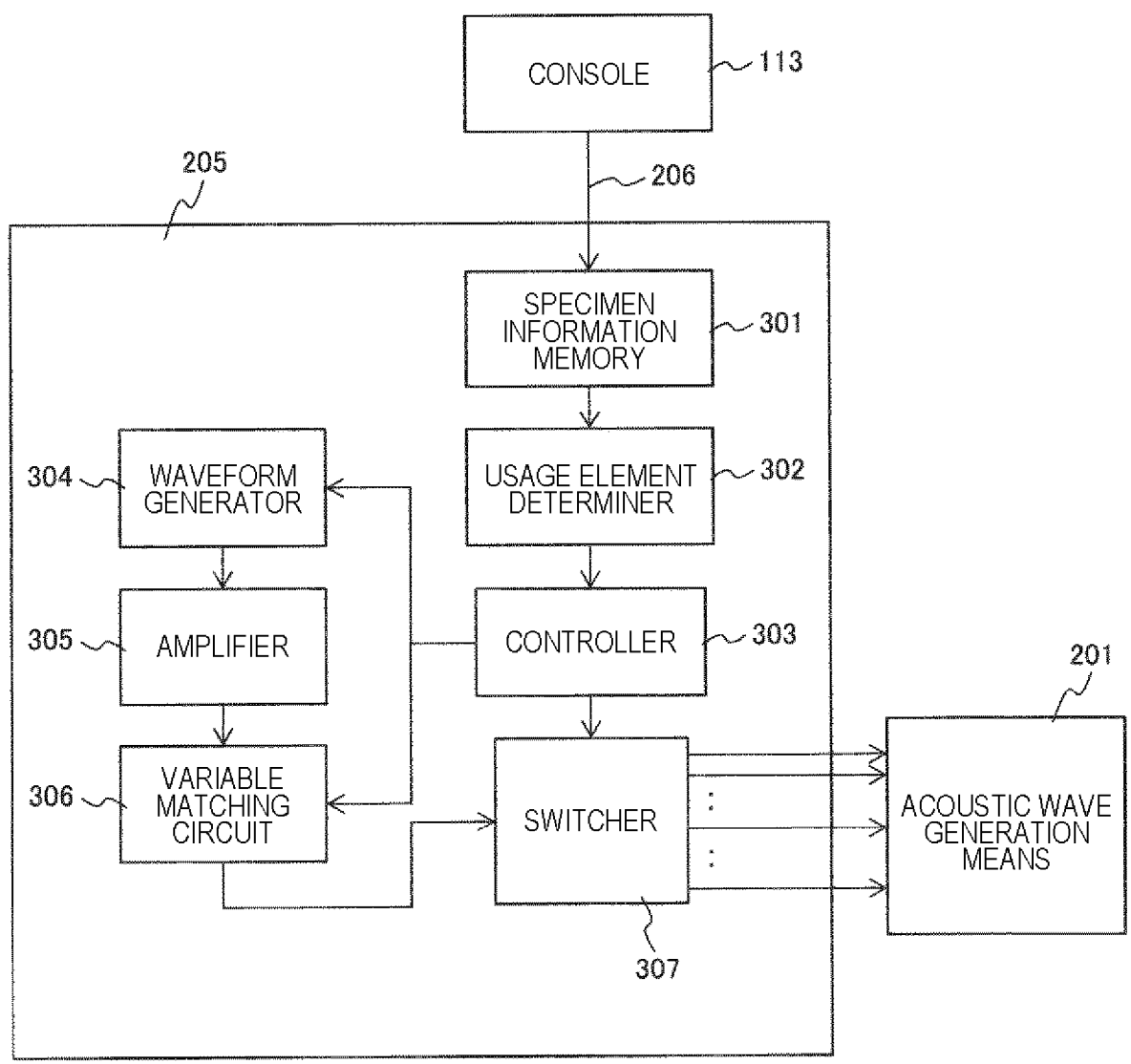
FIG. 3 is a block diagram explaining a drive unit 205 described in the first embodiment.

FIG. 3 is a block diagram explaining the drive unit 205 described in the first embodiment.

The drive unit 205 includes a specimen information memory 301, a usage element determiner 302, a controller 303, a waveform generator 304, an amplifier 305, a variable matching circuit 306, and a switcher 307.

The specimen information memory 301 stores the information 206 received from the console 113. The information 206 is specimen information and is information necessary for setting a stirring condition for stirring the specimen 211. For example, the specimen information is the liquid amount (sample amount, reagent amount, and ratio between sample amount and reagent amount) of the specimen 211 to be stirred in the reaction vessel 102, the viscosity of the specimen 211, the shape of the reaction vessel 102, and the like.

The usage element determiner 302 has correspondence information between the specimen information and the stirring condition. Then, the usage element determiner 302 determines a stirring condition compatible for the specimen information transmitted from the specimen information memory 301. That is, the usage element determiner 302 determines the stirring condition compatible for the transmitted specimen information based on the correspondence information stored in advance. The stirring condition is, for example, the amplitude of the acoustic wave, the frequency of the acoustic wave, the cycle of the acoustic wave, the combination of the segments 207 to be driven, the irradiation time (stirring time) of the acoustic wave, and the like.

The controller 303 transmits a control signal to the waveform generator 304, the variable matching circuit 306, and the switcher 307 based on the stirring condition (setting information) transmitted from the usage element determiner 302.

The waveform generator 304 generates a waveform signal based on the transmitted setting information.

The amplifier 305 amplifies a waveform signal generated by the waveform generator 304.

The variable matching circuit 306 adjusts an impedance difference between the amplifier 305 and the switcher 307.

The switcher 307 controls drive of the acoustic wave generation unit 201 by ON/OFF control. That is, using a switch, the switcher 307 controls ON/OFF of the piezoelectric element. For example, the height of the liquid surface of the specimen 211 injected into the reaction vessel 102 is calculated from the liquid amount of the specimen 211 to be stirred in the reaction vessel 102, and an optimum acoustic wave irradiation region is determined.

Then, the segment 207 corresponding to this acoustic wave irradiation region is determined, and the acoustic wave generation unit 201 (piezoelectric element) is driven.

A waveform signal (voltage) with a modulated amplitude (output) is applied from the drive unit 205 to the acoustic wave generation unit 201 (piezoelectric element). Therefore, the acoustic wave generated from the acoustic wave generation unit 201 (piezoelectric element) also becomes an acoustic wave corresponding to the amplitude modulation, and the reaction vessel 102 is irradiated with the acoustic wave corresponding to the amplitude modulation.

In this manner, the acoustic wave that is optimal for the specimen 211 to be stirred, that is, the segment 207 that is optimal for the liquid amount of the specimen 211 to be stirred in the reaction vessel 102 is determined. Then, power is supplied to the determined piezoelectric element, and an acoustic wave is generated.

Next, the signal unit 214 described in the first embodiment will be explained.

Figure 4:
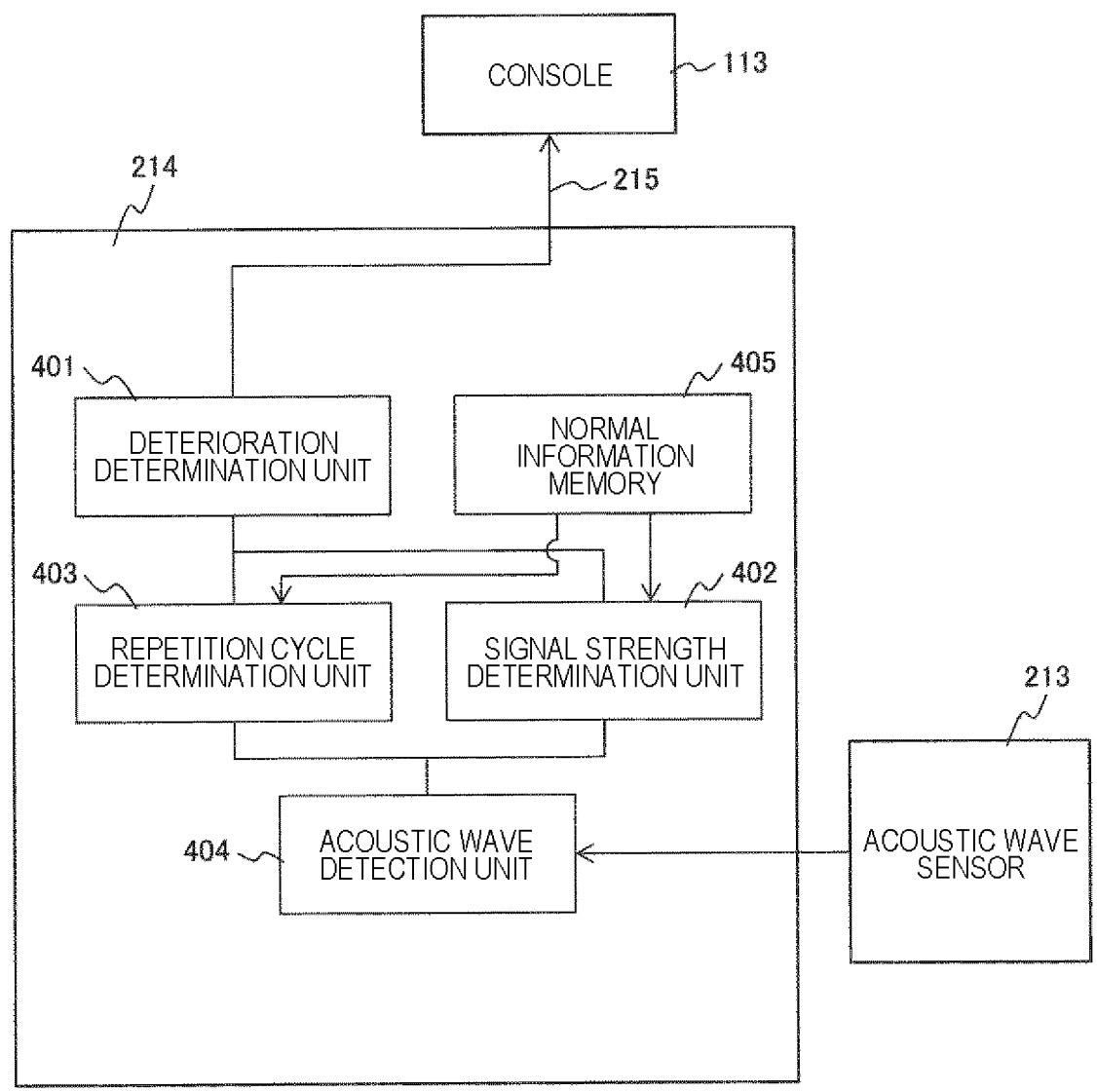
FIG. 4 is a block diagram explaining a signal unit 214 described in the first embodiment.

FIG. 4 is a block diagram explaining the signal unit 214 described in the first embodiment.

The signal unit 214 includes a deterioration determination unit 401, a signal strength determination unit 402, a repetition cycle determination unit 403, an acoustic wave detection unit 404, and a normal information memory 405.

The acoustic wave detection unit 404 processes (analog/digital converts) the detection signal detected by the acoustic wave sensor 213. Then, the detection signal having been analog/digital-converted by the acoustic wave detection unit 404 is transmitted to the signal strength determination unit 402 and the repetition cycle determination unit 403.

The normal information memory 405 stores normal time information. The normal time information is a normal time signal to be received at normal time with respect to, for example, the liquid amount of the specimen 211 to be stirred in the reaction vessel 102, the ratio between the sample amount and the reagent amount, the viscosity of the specimen 211, the shape of the reaction vessel 102, the amplitude of the acoustic wave, the frequency of the acoustic wave, the cycle (amplitude present time and amplitude absent time) of the acoustic wave, the combination of the segments 207 to be driven, the irradiation time (stirring time) of the acoustic wave, and the like.

The normal time information includes a transmission cycle TT at normal time, a reception cycle RR at normal time, an amplitude TT-A of a transmission waveform at normal time, a frequency TT-F of a transmission waveform at normal time, a propagation time tt of a reception waveform at normal time, and a ratio of an amplitude present time R-ON and an amplitude absent time R-OFF at normal time.

The signal strength determination unit 402 compares a detection signal transmitted from the acoustic wave detection unit 404 with a normal time signal stored in the normal information memory 405. In particular, the amplitude of the acoustic wave or the frequency of the acoustic wave in the detection signal is compared with the amplitude of the acoustic wave or the frequency of the acoustic wave in the normal time signal.

Then, the deterioration determination unit 401 diagnoses that the piezoelectric element is normal when these differences fall within a predetermined range set in advance, and diagnoses that the piezoelectric element is abnormal when these differences are larger or smaller than the predetermined range set in advance, and diagnoses deterioration of the piezoelectric element.

The repetition cycle determination unit 403 compares the detection signal transmitted from the acoustic wave detection unit 404 with the normal time signal stored in the normal information memory 405.

That is, the repetition cycle determination unit 403 compares the cycle characteristic of the acoustic wave in the detection signal with the cycle characteristic of the acoustic wave in the normal time signal. In particular, the cycle (amplitude detection time and amplitude non-detection time) of the acoustic wave in the detection signal is compared with the cycle (amplitude present time and amplitude absent time) of the acoustic wave in the normal time signal.

Specifically, (the total time of the amplitude detection time and the amplitude non-detection time) and (the total time of the amplitude present time and the amplitude absent time) are compared, and/or (the ratio of the amplitude detection time and the amplitude non-detection time) and (the ratio of the amplitude present time and the amplitude absent time) are compared. Then, the propagation time in the detection signal is compared with the propagation time in the normal time signal.

Then, when the difference in the total time and the ratio or the propagation time falls within a predetermined range set in advance, the deterioration determination unit 401 diagnoses that there is no deformation or positional displacement of the reaction vessel 102 and the liquid amount of the specimen 211 in the reaction vessel 102 is normal.

On the other hand, when the difference between the total time and the ratio or the propagation time is larger or smaller than the predetermined range set in advance, the deterioration determination unit 401 diagnoses that there is deformation or positional displacement of the reaction vessel 102 and there is an abnormality in the liquid amount of the specimen 211 in the reaction vessel 102.

That is, due to this, deformation or positional displacement of the reaction vessel 102 and normality of the liquid amount of the specimen 211 in the reaction vessel 102 are diagnosed.

Based on the comparison result in the signal strength determination unit 402 and the comparison result in the repetition cycle determination unit 403, the deterioration determination unit 401 determines (diagnoses) deterioration of the piezoelectric element, deformation or positional displacement of the reaction vessel 102, and normality of the liquid amount of the specimen 211 in the reaction vessel 102. Then, the deterioration determination unit 401 transmits the determination result (processed result) to the console 113 as the information 215, and the console 113 displays the determination result.

That is, in the first embodiment, by comparing the characteristics of the acoustic wave at normal time with the characteristics of the detected acoustic wave, it is possible to achieve not only diagnosis of deterioration of the piezoelectric element but also diagnosis of deformation or positional displacement of the reaction vessel 102 and diagnosis of normality of the liquid amount of the specimen 211 in the reaction vessel 102.

Here, the characteristics of the acoustic wave include the amplitude of the acoustic wave (amplitude TT-A of transmission waveform), the frequency of the acoustic wave (frequency TT-F of transmission waveform), the cycle of the acoustic wave (amplitude detection time R-ON and amplitude non-detection time R-OFF), the transmission cycle TT, the reception cycle RR, the propagation time tt of the reception waveform, and the ratio between the amplitude detection time R-ON and the amplitude non-detection time R-OFF.

The cycle characteristics of the acoustic wave include the cycle of the acoustic wave (amplitude detection time R-ON and amplitude non-detection time R-OFF), the transmission cycle TT, the reception cycle RR, the propagation time tt of the reception waveform, and the ratio between the amplitude detection time R-ON and the amplitude non-detection time R-OFF.

Thus, the chemical analysis apparatus according to the first embodiment includes, for example, the sample dispensing mechanism 107 that dispenses a sample into the reaction vessel 102, the reagent dispensing mechanism 108 that dispenses a reagent into the reaction vessel 102, the stirring mechanism 109 that stirs, by the acoustic wave, a dispensed sample and a dispensed reagent in the reaction vessel 102, the photometric mechanism 110 that measures absorbance of the specimen 211 in the reaction vessel 102 during and/or after reaction, the cleaning mechanism 111 that cleans the reaction vessel 102 after measurement is finished, the controller 112 that controls the sample dispensing mechanism 107, the reagent dispensing mechanism 108, the stirring mechanism 109, the photometric mechanism 110, and the cleaning mechanism 111, and the console 113 as an input/output apparatus.

The controller 112 includes the drive unit 205 that controls drive of the acoustic wave generation unit 201 of the stirring mechanism 109, and the signal unit 214 that processes a detection signal detected by the acoustic wave sensor 213 of the stirring mechanism 109.

The signal unit 214 includes the acoustic wave detection unit 404 that performs analog/digital conversion of a detection signal detected by the acoustic wave sensor 213, the normal information memory 405 that stores normal time information, the signal strength determination unit 402 that compares the amplitude of the acoustic wave or the frequency of the acoustic wave transmitted from the acoustic wave detection unit 404 with the amplitude of the acoustic wave or the frequency of the acoustic wave stored in the normal information memory 405, the repetition cycle determination unit 403 that compares the cycle of the acoustic wave transmitted from the acoustic wave detection unit 404 with the cycle of the acoustic wave stored in the normal information memory 405, and the deterioration determination unit 401 that determines deterioration of the piezoelectric element and normality of the reaction vessel 102 (deformation or positional displacement of the reaction vessel 102 and normality of the liquid amount of the specimen 211 in the reaction vessel 102) based on a comparison result in the signal strength determination unit 402 and a comparison result in the repetition cycle determination unit 403.

Thus, according to the first embodiment, in particular, using the cycle of an acoustic wave and the like, it is possible to achieve diagnosis of deformation or positional displacement of the reaction vessel 102 and diagnosis of normality of the liquid amount of the specimen 211 in the reaction vessel 102, and it is possible to provide a chemical analysis apparatus having high reliability of stirring performance.

According to the first embodiment, the specimen 211 can be sufficiently stirred with a strong stirring force, and on the other hand, there is no risk that the liquid surface of the specimen 211 swells and the specimen 211 scatters from the reaction vessel 102.

According to the first embodiment, the acoustic wave sensor 213 can detect the detection signal during stirring, and the detection signal also reflects the behavior (shaking) of the liquid surface of the specimen 211.

Next, the propagation path of an acoustic wave propagating from the acoustic wave generation unit 201 to the acoustic wave sensor 213 will be explained.

Figure 5:
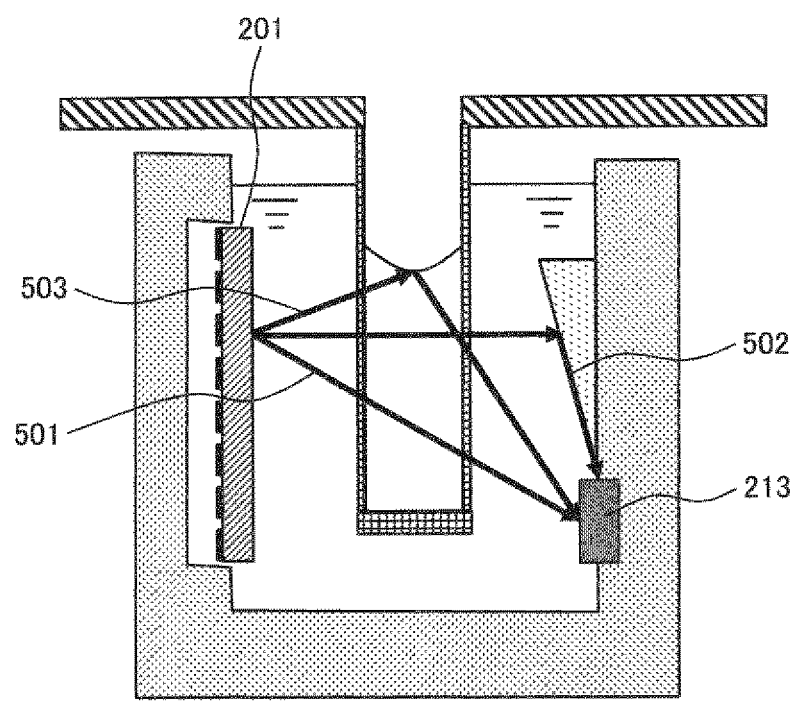
FIG. 5 is an explanatory diagram explaining a propagation path of an acoustic wave propagating from an acoustic wave generation unit 201 to an acoustic wave sensor 213.

FIG. 5 is an explanatory diagram explaining the propagation path of an acoustic wave propagating from the acoustic wave generation unit 201 to the acoustic wave sensor 213.

The propagation paths from the acoustic wave generation unit 201 to the acoustic wave sensor 213 include propagation paths such as (1) the acoustic wave propagation path 501 that directly propagates, (2) the acoustic wave propagation path 502 that propagates via the acoustic wave reflection unit 202, and (3) the acoustic wave propagation path 503 that reflects on a gas-liquid interface of the reaction vessel 102 and propagates.

Next, the transmission waveform (transmission signal) and the reception waveform (reception signal) of an acoustic wave in each acoustic wave propagation path will be explained. In the following drawings, a horizontal axis represents time, and a vertical axis represents amplitude.

Figure 6:
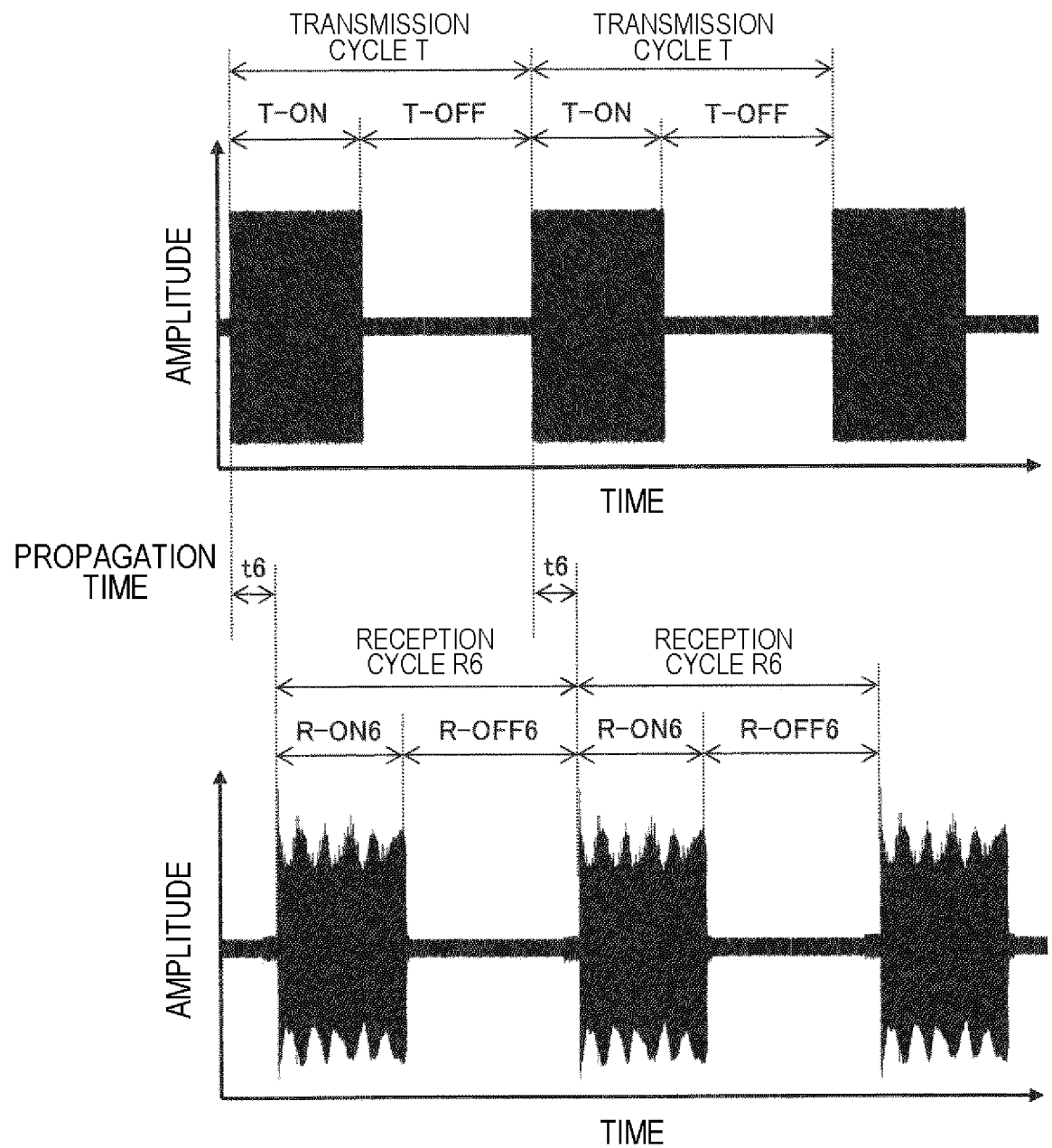
FIG. 6 is a schematic diagram explaining a transmission waveform and a reception waveform of an acoustic wave in an acoustic wave propagation path 501.

FIG. 6 is a schematic diagram explaining a transmission waveform and a reception waveform of an acoustic wave in the acoustic wave propagation path 501.

In the transmission waveform of the acoustic wave in the acoustic wave propagation path 501, the transmission cycle T (one cycle) includes an acoustic wave irradiation time (current application time) T-ON and an acoustic wave non-irradiation time (current non-application time) T-OFF.

The transmission cycle T is indicated by detecting a current flowing through a drive circuit that drives the acoustic wave generation unit 201. The transmission cycle T is adjusted by the shape of the reaction vessel 102, the liquid amount of the specimen 211, and the like.

In the reception waveform of the acoustic wave in the acoustic wave propagation path 501, a reception cycle R6 (one cycle) includes an acoustic wave detection time (amplitude detection time) R-ON6 and an acoustic wave non-detection time (amplitude non-detection time) R-OFF6.

The reception waveform is detected after propagation time t6 has elapsed because the acoustic wave generated from the acoustic wave generation unit 201 passes through the constant temperature water 204, the reaction vessel 102, and the specimen 211 and propagates to the acoustic wave sensor 213.

The reception cycle R6 and the transmission cycle T indicate an equivalent signal cycle. Even if the reception cycle R6 and the transmission cycle T are the equivalent signal cycle, when there is deformation or positional displacement of the reaction vessel 102 and there is an abnormality in the liquid amount of the specimen 211 in the reaction vessel 102, the ratio between the detection time R-ON6 and the non-detection time R_OFF6 and the ratio between the irradiation time T-ON and the non-irradiation time T-OFF may change.

The frequency of the acoustic wave is on the order of MHz, and the cycle of the acoustic wave is on the order of several tens of Hz.

Figure 7:
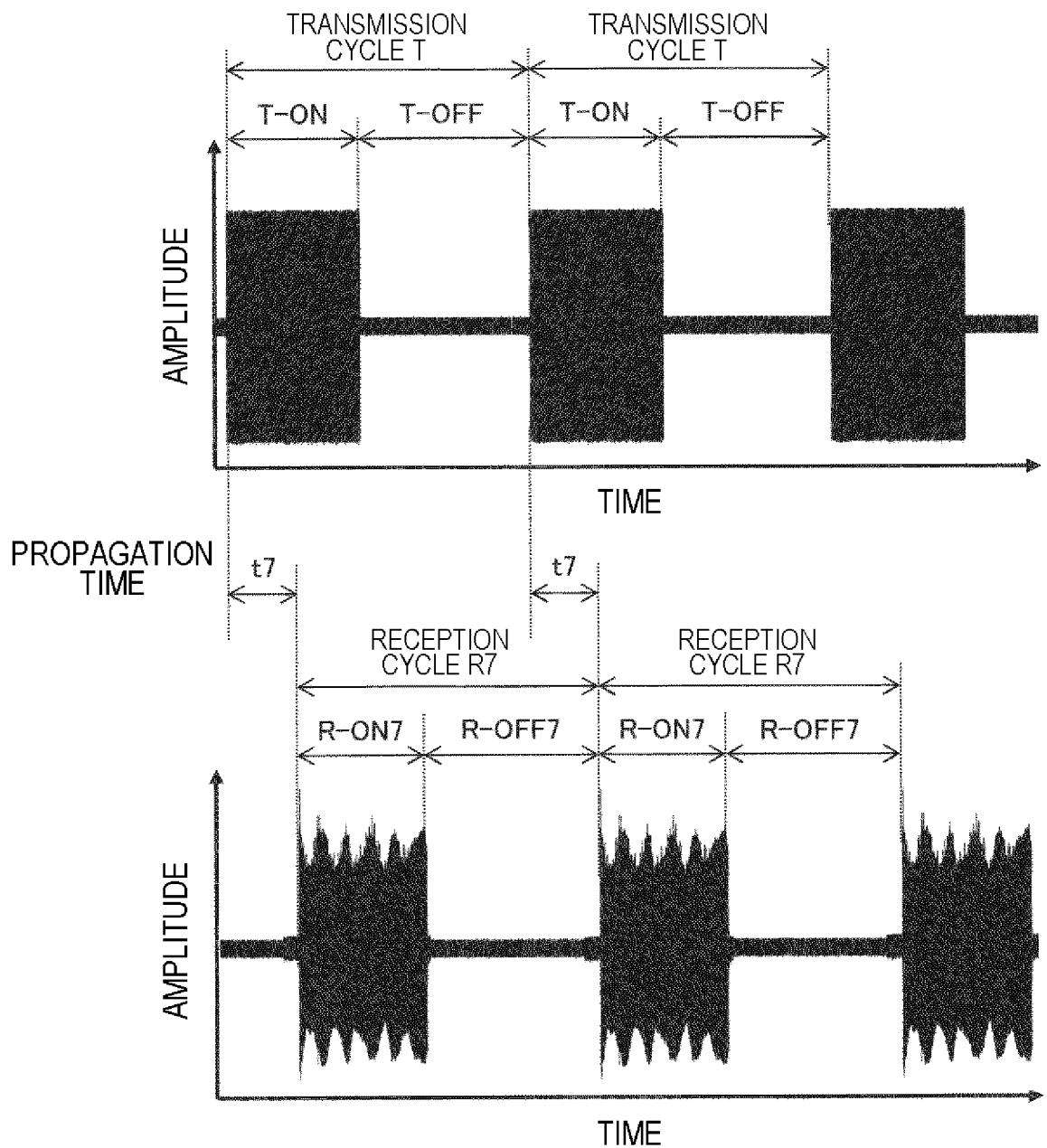
FIG. 7 is a schematic diagram explaining a transmission waveform and a reception waveform of an acoustic wave in an acoustic wave propagation path 502.

FIG. 7 is a schematic diagram explaining a transmission waveform and a reception waveform of an acoustic wave in the acoustic wave propagation path 502.

The transmission waveform of the acoustic wave in the acoustic wave propagation path 502 is similar to that in FIG. 6.

The reception waveform of the acoustic wave in the acoustic wave propagation path 502 is also substantially similar to that in FIG. 6. A reception cycle R7 (one cycle) includes an acoustic wave detection time (amplitude detection time) R-ON7 and an acoustic wave non-detection time (amplitude non-detection time) R-OFF7.

The reception waveform is detected after propagation time t7 has elapsed because the acoustic wave generated from the acoustic wave generation unit 201 passes through the constant temperature water 204, the reaction vessel 102, and the specimen 211, via the acoustic wave reflection unit 202, and propagates to the acoustic wave sensor 213. Note that the propagation time t7 is longer than the propagation time t6.

Figure 8:
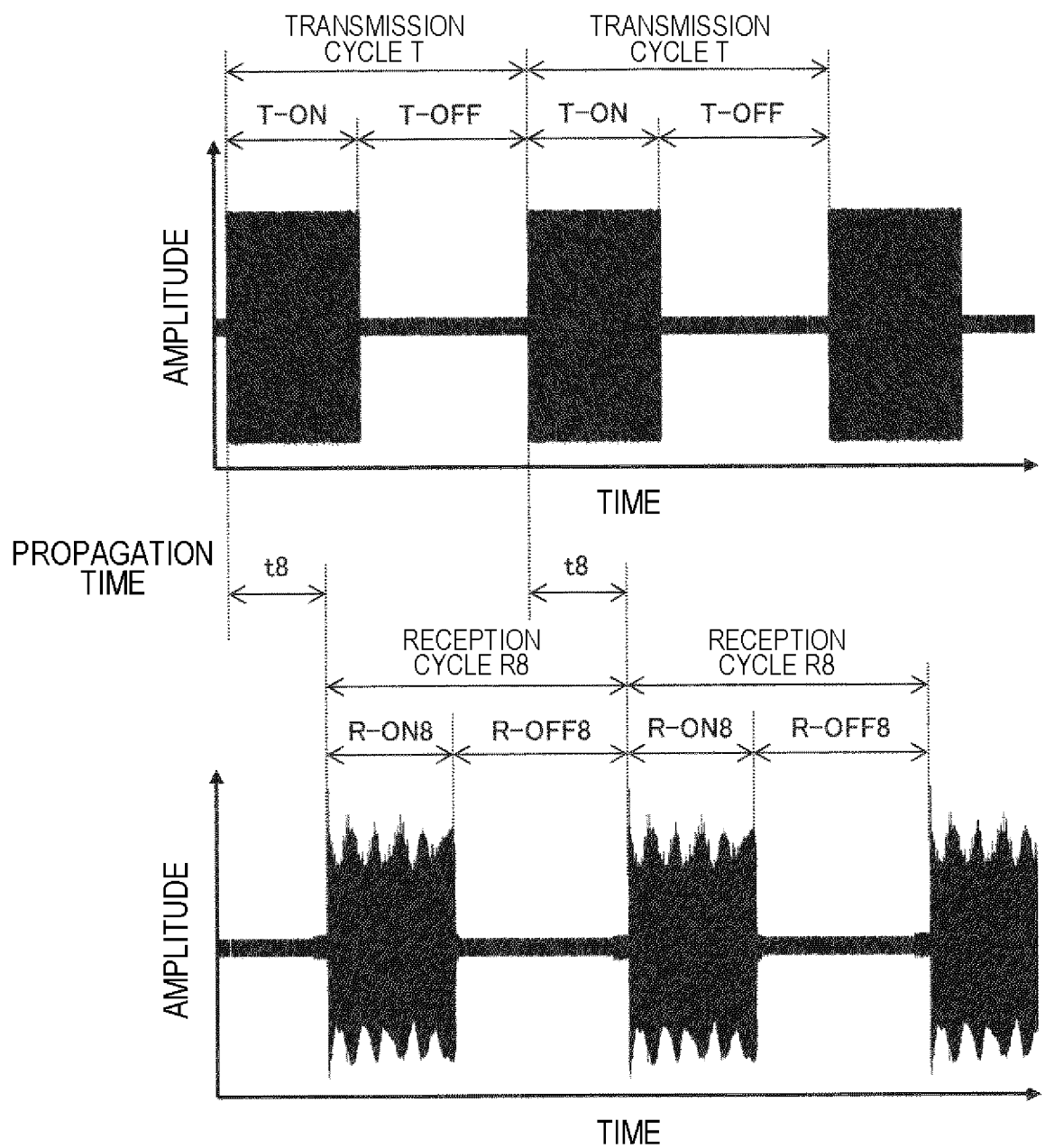
FIG. 8 is a schematic diagram explaining a transmission waveform and a reception waveform of an acoustic wave in an acoustic wave propagation path 503.

FIG. 8 is a schematic diagram explaining a transmission waveform and a reception waveform of an acoustic wave in the acoustic wave propagation path 503.

The transmission waveform of the acoustic wave in the acoustic wave propagation path 503 is similar to that in FIGS. 6 and 7.

The reception waveform of the acoustic wave in the acoustic wave propagation path 503 is also substantially similar to that in FIGS. 6 and 7. A reception cycle R8 (one cycle) includes an acoustic wave detection time (amplitude detection time) R-ON8 and an acoustic wave non-detection time (amplitude non-detection time) R-OFF8.

The reception waveform is detected after propagation time t8 has elapsed because the acoustic wave generated from the acoustic wave generation unit 201 passes through the constant temperature water 204, the reaction vessel 102, and the specimen 211, is reflected at the gas-liquid interface of the reaction vessel 102, and propagates to the acoustic wave sensor 213. Note that the propagation time t8 is longer than the propagation time t6 and the propagation time t7.

Figure 9:
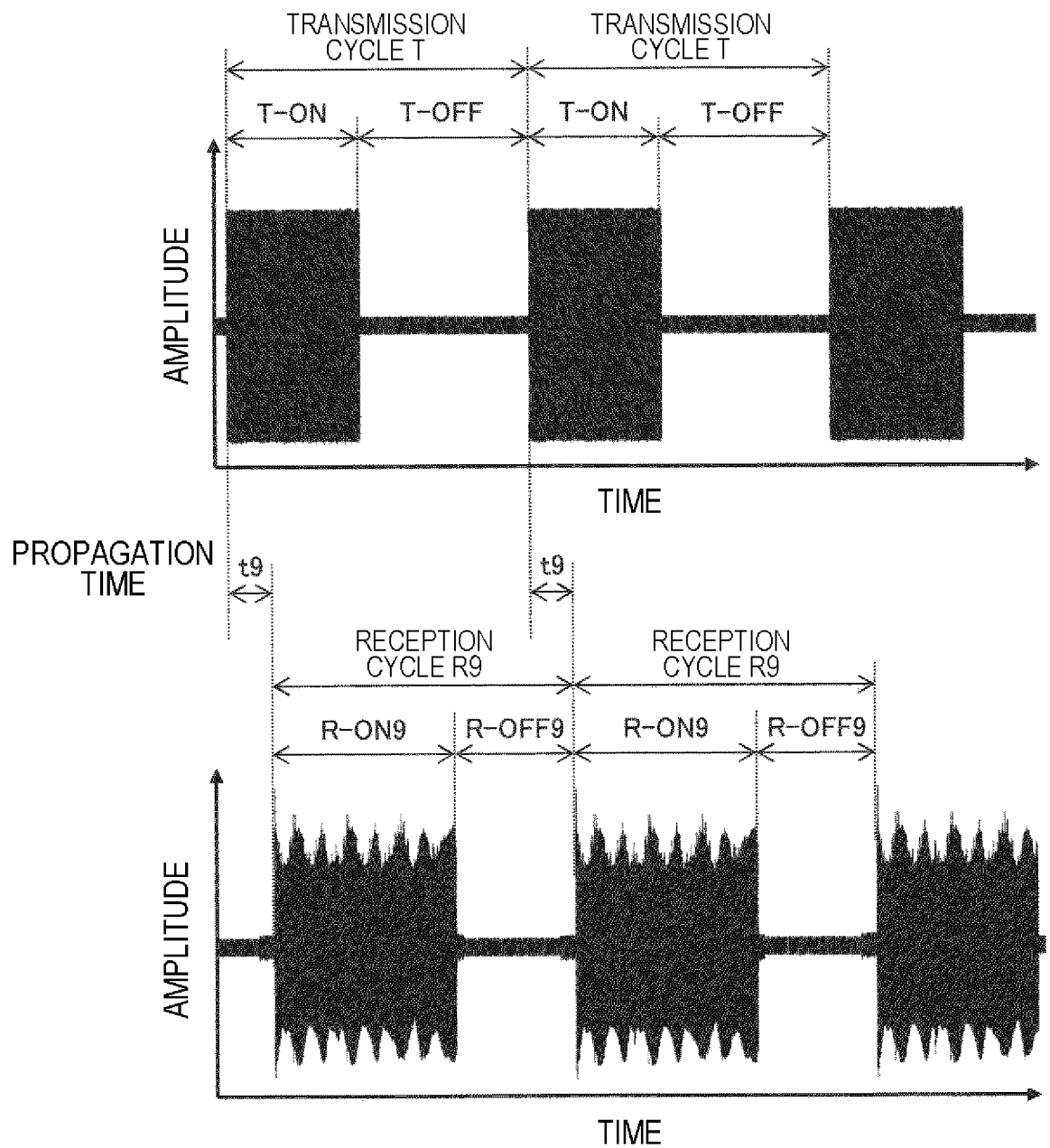
FIG. 9 is a schematic diagram explaining a transmission waveform and a reception waveform of an acoustic wave in the acoustic wave propagation path 501, the acoustic wave propagation path 502, and the acoustic wave propagation path 503.

FIG. 9 is a schematic diagram explaining a transmission waveform and a reception waveform of an acoustic wave in the acoustic wave propagation path 501, the acoustic wave propagation path 502, and the acoustic wave propagation path 503.

The transmission waveform of the acoustic wave in the acoustic wave propagation path 501, the acoustic wave propagation path 502, and the acoustic wave propagation path 503 are similar to those in FIGS. 6, 7, and 8.

In the reception waveform of the acoustic wave in the acoustic wave propagation path 501, the acoustic wave propagation path 502, and the acoustic wave propagation path 503, a reception cycle R9 (one cycle) includes an acoustic wave detection time (amplitude detection time) R-ON9 and an acoustic wave non-detection time (amplitude non-detection time) R-OFF9.

The reception waveform is detected after propagation time t9 has elapsed because the acoustic wave generated from the acoustic wave generation unit 201 and propagated through the acoustic wave propagation path 501, the acoustic wave propagation path 502, and the acoustic wave propagation path 503 propagates to the acoustic wave sensor 213. Note that the propagation time t9 is equivalent to the propagation time t6.

Since three reception waveforms overlap, the detection time R-ON9 becomes longer than the detection time RON6, the detection time R-ON7, and the detection time R-ON8, and the amplitude also changes.

Thus, the acoustic wave sensor 213 detects the three reception waveforms that are overlapping. In particular, by using the cycle of this reception waveform and the like (cycle of the acoustic wave and the like), it is possible to achieve diagnosis of deformation or positional displacement of the reaction vessel 102 and diagnosis of normality of the liquid amount of the specimen 211 in the reaction vessel 102.

Next, the flow for diagnosing deterioration of the piezoelectric element and normality of the reaction vessel 102 described in the first embodiment will be explained.

Figure 10:
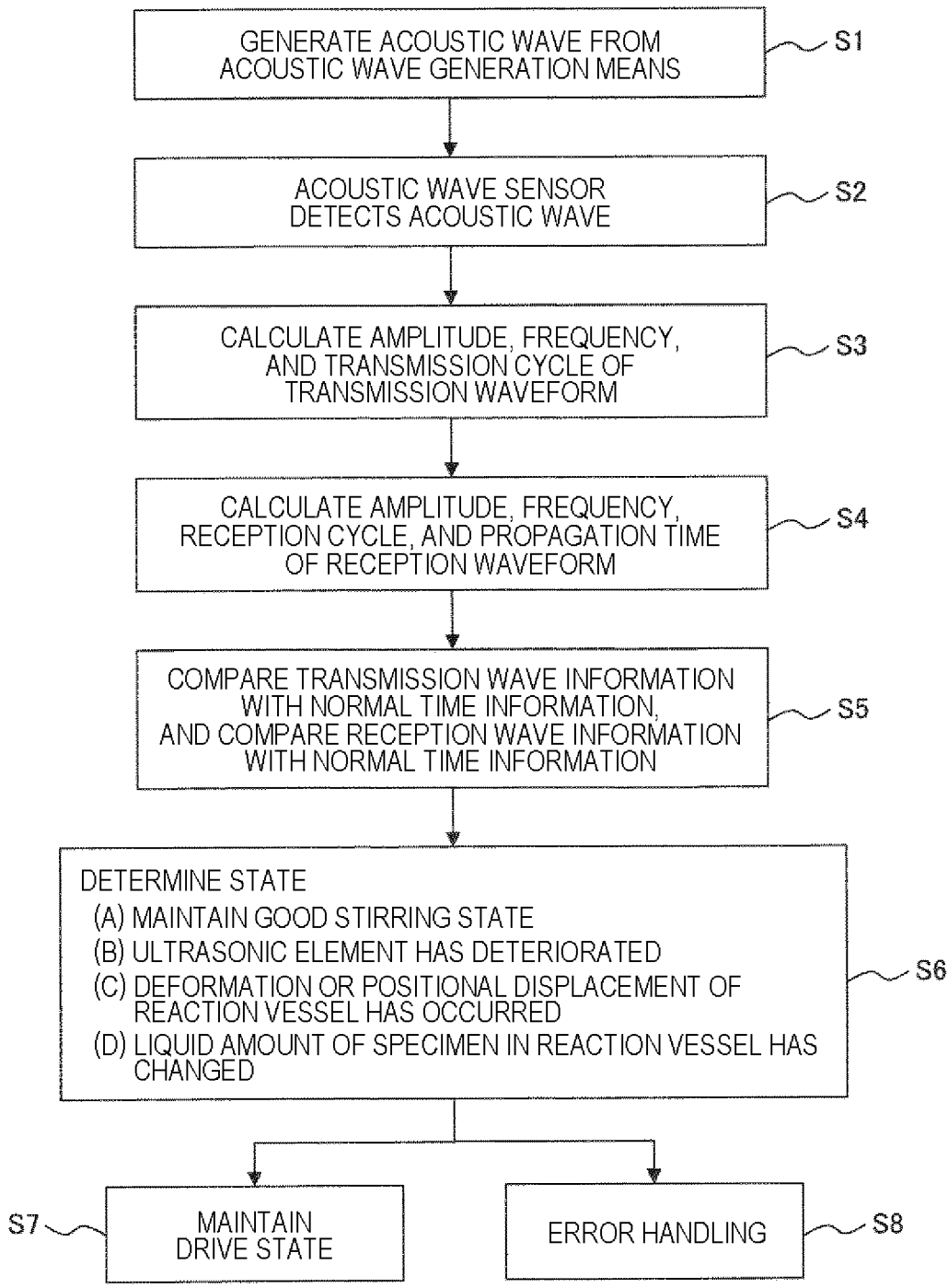
FIG. 10 is a flowchart for diagnosing deterioration of a piezoelectric element and normality of a reaction vessel 102 described in the first embodiment.

FIG. 10 is a flowchart for diagnosing deterioration of a piezoelectric element and normality of the reaction vessel 102 described in the first embodiment.

In S1, an acoustic wave is generated from the acoustic wave generation unit 201, and the specimen 211 is stirred.

In S2, the acoustic wave (detection signal) propagated by the acoustic wave sensor 213 is detected.

In S3, the current flowing through the drive circuit is detected, and the amplitude of the transmission waveform, the frequency of the transmission waveform, and the transmission cycle T (these are referred to as transmission wave information) are calculated using a common technique.

In S4, using the detection signal detected by the acoustic wave sensor 213, the amplitude of the reception waveform, the frequency of the reception waveform, the reception cycle R9, and the propagation time t9 (these are referred to as reception wave information) are calculated using a common technique.

In S5, the transmission wave information is compared with the normal time information, and the reception wave information is compared with the normal time information.

In S6, deterioration of the piezoelectric element and normality of the reaction vessel 102 are diagnosed. That is, the state is determined.

The determination is classified as follows.

(A) Maintain good stirring state.
(B) Piezoelectric element has deteriorated.
(C) Deformation or positional displacement of the reaction vessel 102 has occurred.
(D) Liquid amount of the specimen 211 in the reaction vessel 102 has changed.

Note that (A) is a normal state, and (B), (C), and (D) are abnormal states.

In S7, in the case of (A), the current drive state is maintained.

In S8, in the cases of (B), (C), and (D), an error is displayed on the console 113, and the error is handled. In the case of (B), when it is determined to be output decrease, it is possible to recover the stirring performance by correcting the amplitude of the voltage applied to the piezoelectric element. In the case of an error in which the stirring performance cannot be recovered, the stirring is temporarily stopped.

Thus, according to the first embodiment, in particular, by using the cycle of the reception waveform, it is possible to achieve diagnosis of deformation or positional displacement of the reaction vessel 102 and diagnosis of normality of the liquid amount of the specimen 211 in the reaction vessel 102.

According to the first embodiment, it is possible to improve the accuracy of diagnosis of deterioration of the piezoelectric element, achieve diagnosis of deformation or positional displacement of the reaction vessel 102 and diagnosis of normality of the liquid amount of the specimen 211 in the reaction vessel 102, and provide a chemical analysis apparatus having high reliability of stirring performance.

Next, the diagnosis table for diagnosing deterioration of the piezoelectric element and normality of the reaction vessel 102 described in the first embodiment will be explained.

FIG. 11 is a diagnosis table for diagnosing deterioration of the piezoelectric element and normality of the reaction vessel 102 described in the first embodiment.

In the diagnosis table presented in FIG. 11, for example, the stirring state is classified into one case (A) of the normal state and five cases (B1), (B2), (C), (D1), and (D2) of the abnormal state.

The determination of the normal state (A) corresponds to a case (comparison result) where the transmission cycle T to be detected matches the transmission cycle TT at normal time stored in the normal information memory 405, and where the reception cycle R to be detected matches the reception cycle RR at normal time stored in the normal information memory 405.

Note that match and mismatch are determined by setting a predetermined range in advance in consideration of variations and fluctuations in performance of the piezoelectric element and the drive circuit.

The determination of the abnormal state (B1) corresponds to a case (comparison result) where the amplitude T-A of the transmission waveform to be detected and the amplitude TT-A of the transmission waveform at normal time stored in the normal information memory 405 mismatch. In the case of this determination, it is determined to be output decrease. As a failure mode, it is determined to be deterioration of the piezoelectric element.

The determination of the abnormal state (B2) corresponds to a case (comparison result) where the frequency T-F of the transmission waveform to be detected and the frequency TT-F of the transmission waveform at normal time stored in the normal information memory 405 mismatch. In the case of this determination, it is determined to be frequency shift caused by change in the dimension such as the thickness of the piezoelectric element or the physical property value of the piezoelectric element. As a failure mode, it is determined to be deterioration of the piezoelectric element.

The determination of the abnormal state (C) corresponds to a case (comparison result) where the propagation time t of the reception waveform to be detected and the propagation time tt of the reception waveform at normal time stored in the normal information memory 405 mismatch. In the case of this determination, it is determined to be change in propagation time. As a failure mode, it is determined that there is deformation or positional displacement of the reaction vessel 102.

The determination of the abnormal state (D1) corresponds to a case (comparison result) where the reception cycle R to be detected and the reception cycle RR at normal time stored in the normal information memory 405 mismatch. In the case of this determination, it is determined that the reception cycle RR becomes longer than the reception cycle R, and the liquid amount of the specimen 211 in the reaction vessel 102 has increased. As a failure mode, it is determined to be an increase in the liquid amount.

The determination of the abnormal state (D2) corresponds to a case (comparison result) where the reception cycle R to be detected and the reception cycle RR at normal time stored in the normal information memory 405 mismatch. In the case of this determination, it is determined that the reception cycle RR becomes shorter than the reception cycle R, and the liquid amount of the specimen 211 in the reaction vessel 102 has decreased. As a failure mode, it is determined to be a decrease in the liquid amount.

Note that even in a case where a plurality of cases occur among the five cases of the abnormal state, it is possible to simultaneously detect the cases. For example, in a case where the abnormal state (B1) and the abnormal state (C) occur simultaneously, when there are deterioration of the piezoelectric element and deformation or positional displacement of the reaction vessel 102, it is possible to determine the abnormal state simultaneously by respectively independent determination criteria. For example, also in a case where the abnormal state (B2), the abnormal state (D1), and the abnormal state (D2) occur simultaneously, it is possible to determine the abnormal state simultaneously by respectively independent determination criteria.

Next, the transmission waveform and the reception waveform of an acoustic wave in each case will be explained. In the following drawings, a horizontal axis represents time, and a vertical axis represents amplitude.

Figure 12:
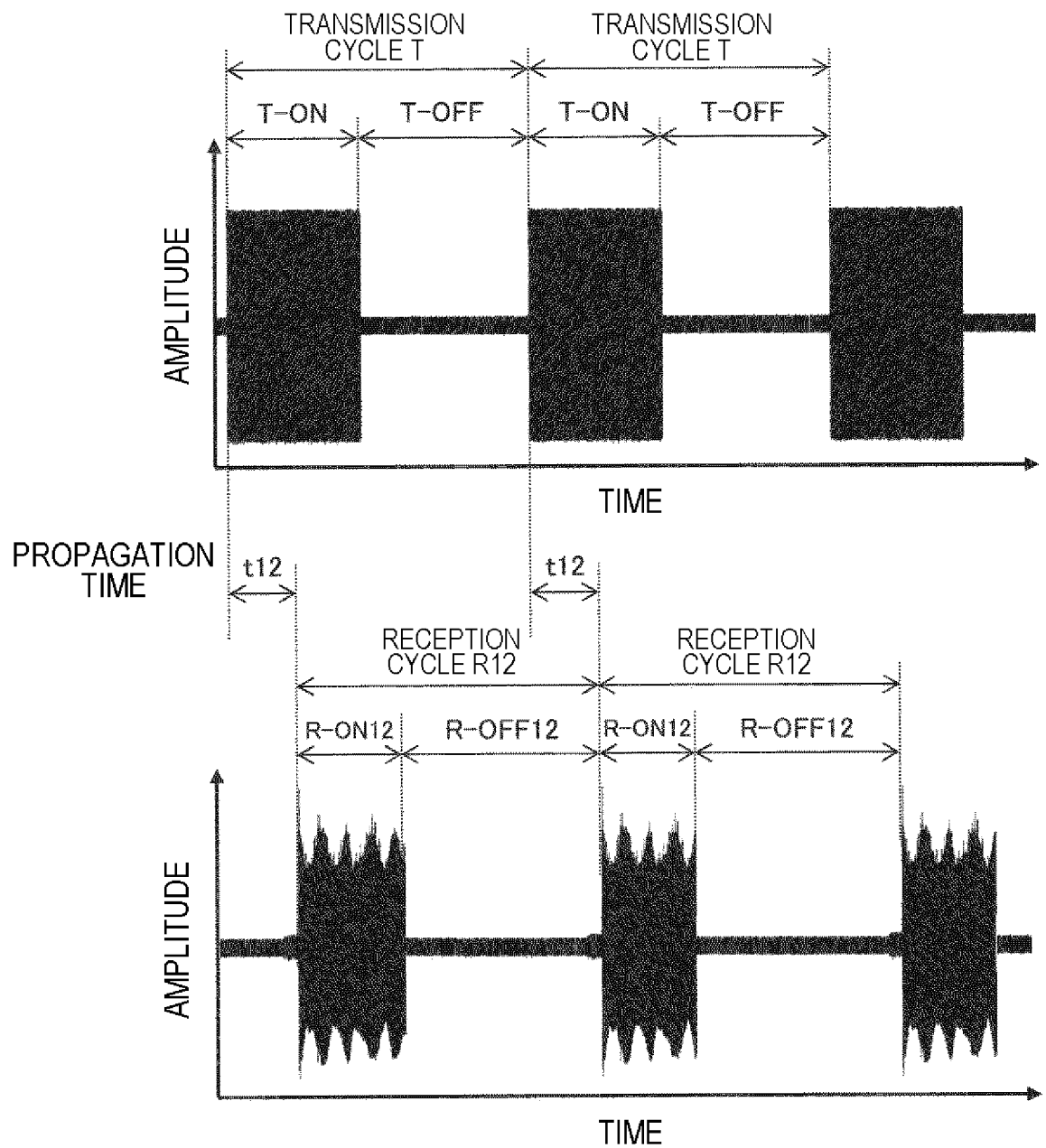
FIG. 12 is a schematic diagram explaining a transmission waveform and a reception waveform of an acoustic wave in a case (A) described in the first embodiment.

FIG. 12 is a schematic diagram explaining the transmission waveform and the reception waveform of an acoustic wave in the case (A) described in the first embodiment.

As illustrated in FIG. 12, the transmission cycle T and the reception cycle R are detected and compared with the transmission cycle TT at normal time and the reception cycle RR at normal time.

Figure 13:
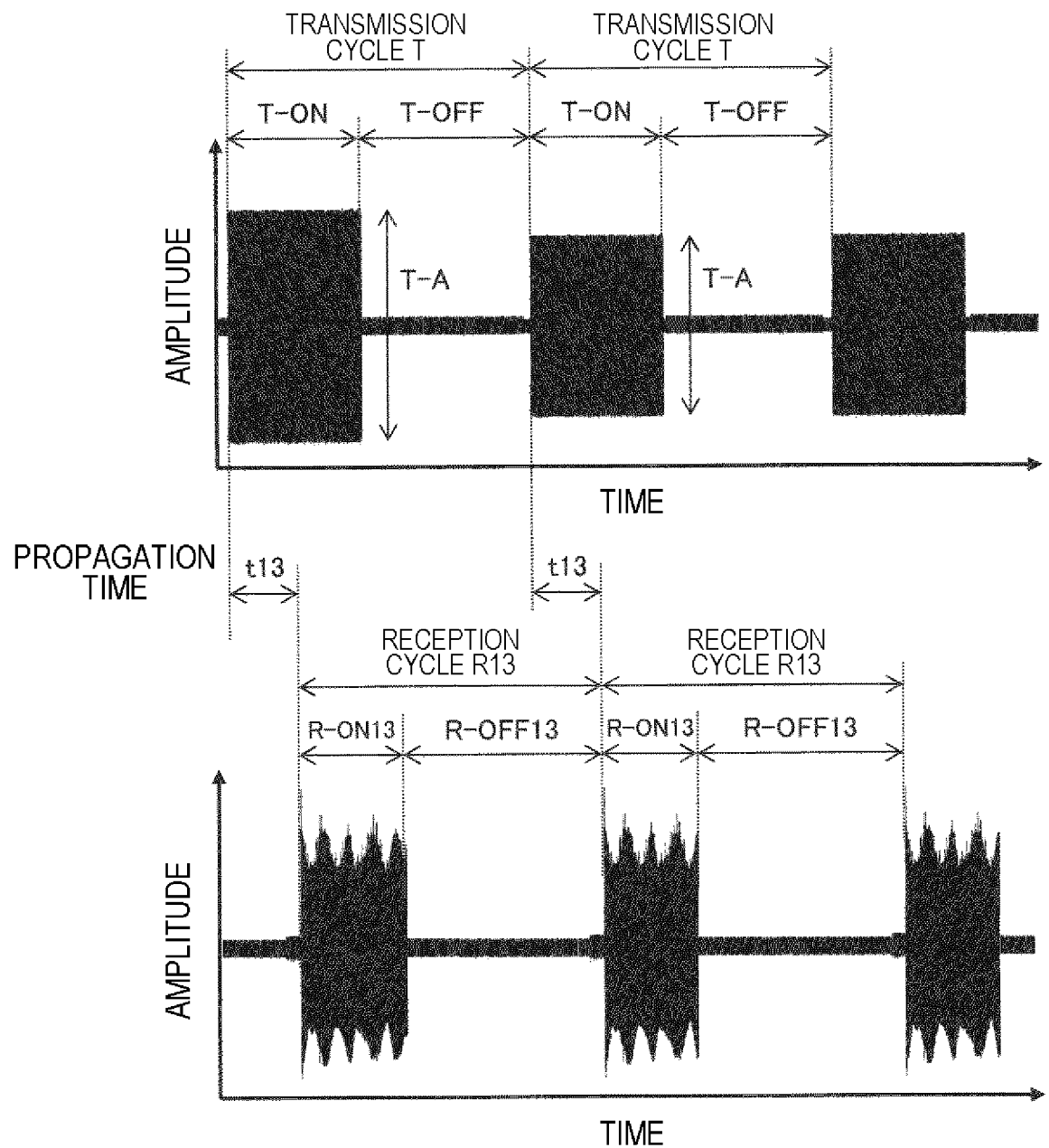
FIG. 13 is a schematic diagram explaining a transmission waveform and a reception waveform of an acoustic wave in a case (B1) described in the first embodiment.

FIG. 13 is a schematic diagram explaining the transmission waveform and the reception waveform of an acoustic wave in the case (B1) described in the first embodiment.

As illustrated in FIG. 13, the amplitude T-A of the transmission waveform is detected and compared with the amplitude TT-A of the transmission waveform at normal time.

Figure 14:
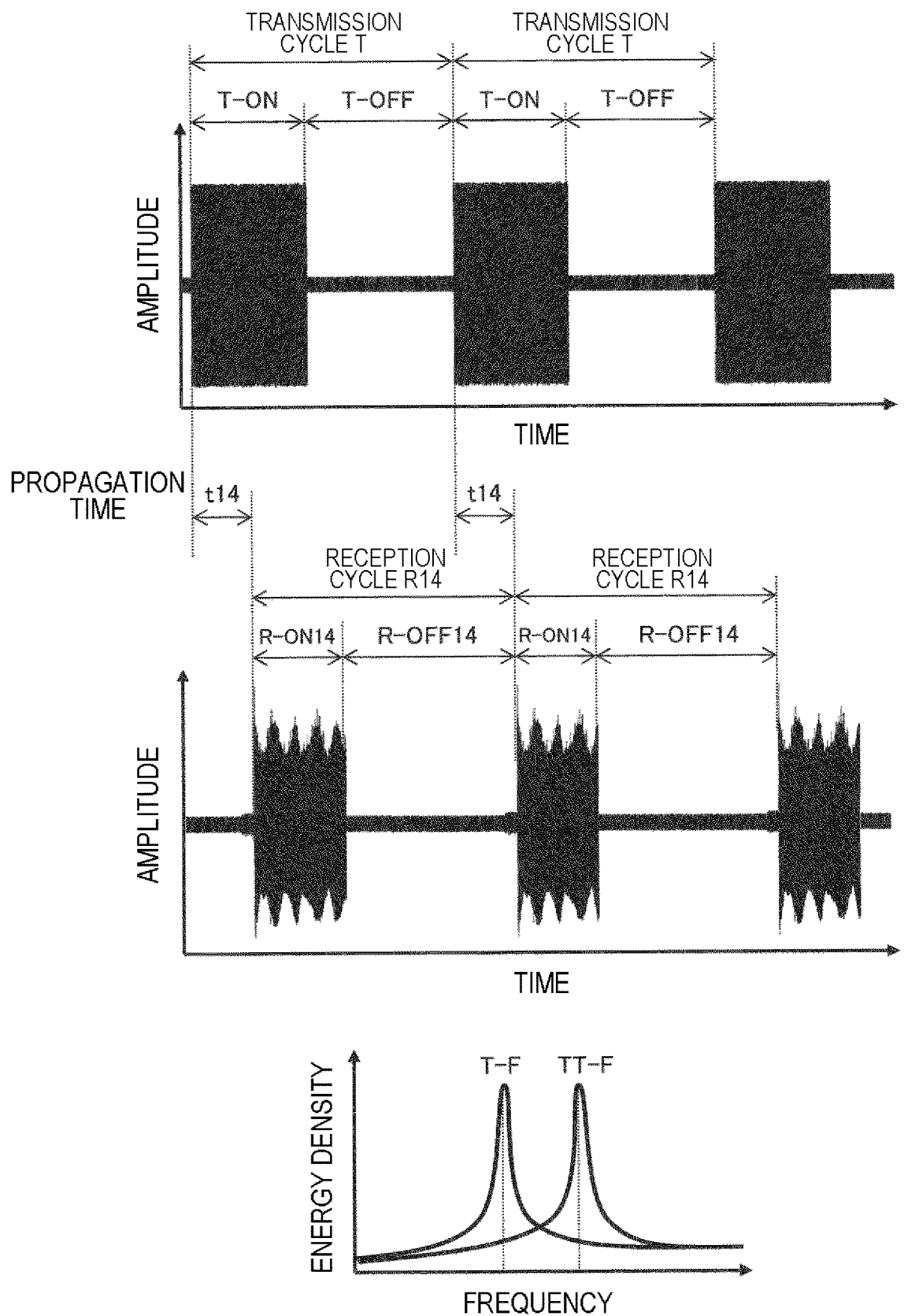
FIG. 14 is a schematic diagram explaining a transmission waveform and a reception waveform of an acoustic wave in a case (B2) described in the first embodiment.

FIG. 14 is a schematic diagram explaining the transmission waveform and the reception waveform of an acoustic wave in the case (B2) described in the first embodiment.

As illustrated in FIG. 14, the frequency T-F of the transmission waveform is detected and compared with the frequency TT-F of the transmission waveform at normal time. Note that the time waveform is subjected to frequency conversion using the detected transmission waveform to derive and compare the relationship between the frequency and the energy density (see the lower diagram of FIG. 14).

Figure 15:
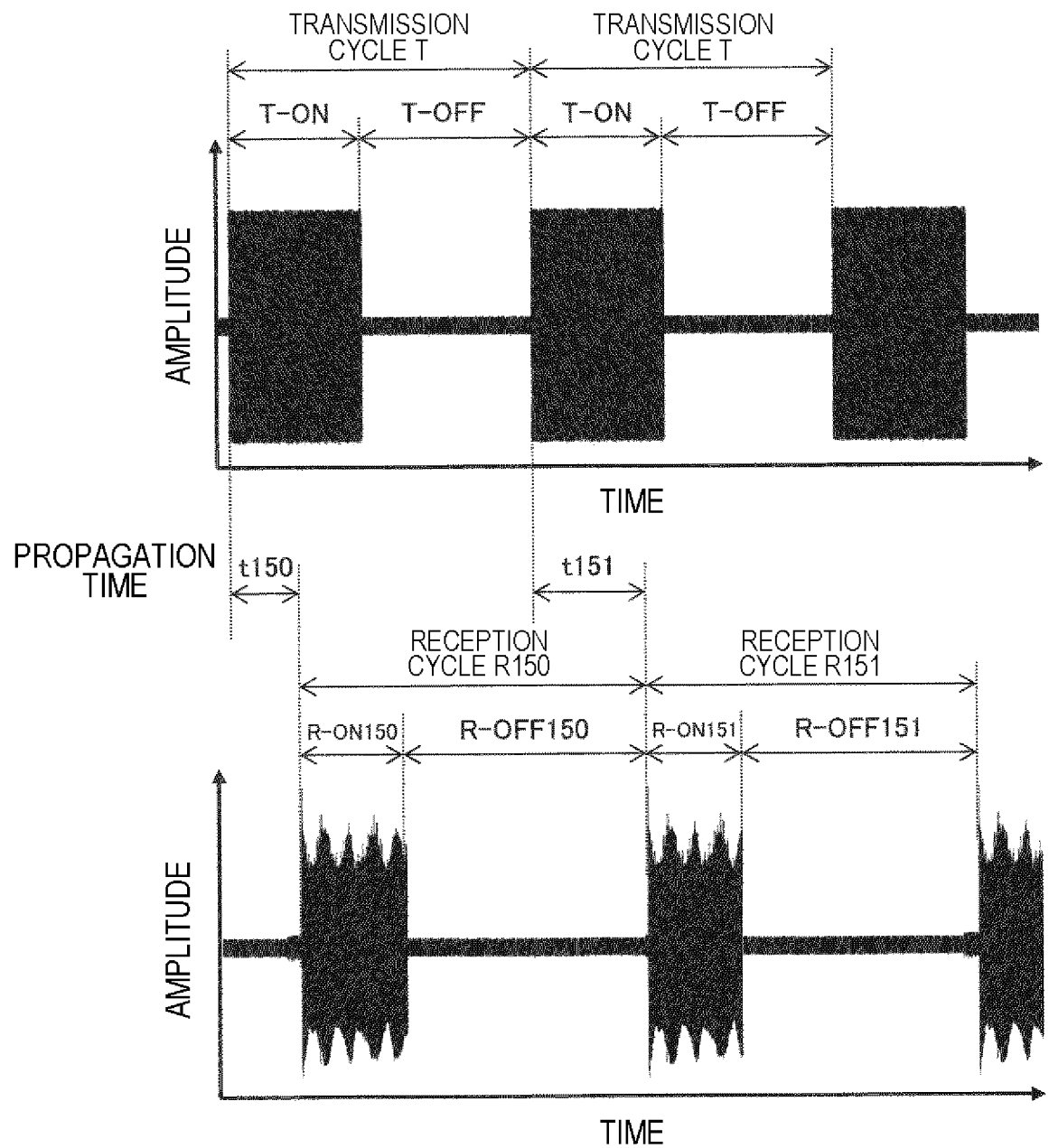
FIG. 15 is a schematic diagram explaining a transmission waveform and a reception waveform of an acoustic wave in a case (C) described in the first embodiment.

FIG. 15 is a schematic diagram explaining the transmission waveform and the reception waveform of an acoustic wave in the case (C) described in the first embodiment.

As illustrated in FIG. 15, the propagation time t of the reception waveform is detected and compared with the propagation time tt of the reception waveform at normal time.

For example, the propagation time tt is compared with propagation time t150, and the propagation time tt is compared with propagation time t151. The difference between the propagation time tt and the propagation time t150 and the difference between the propagation time tt and the propagation time t151 are not constant (within a predetermined range).

This is because the acoustic wave propagation path changes due to presence of deformation or positional displacement of the reaction vessel 102. That is, due to change of the propagation time t, it is possible to achieve diagnosis of deformation or positional displacement of the reaction vessel 102.

Figure 16:
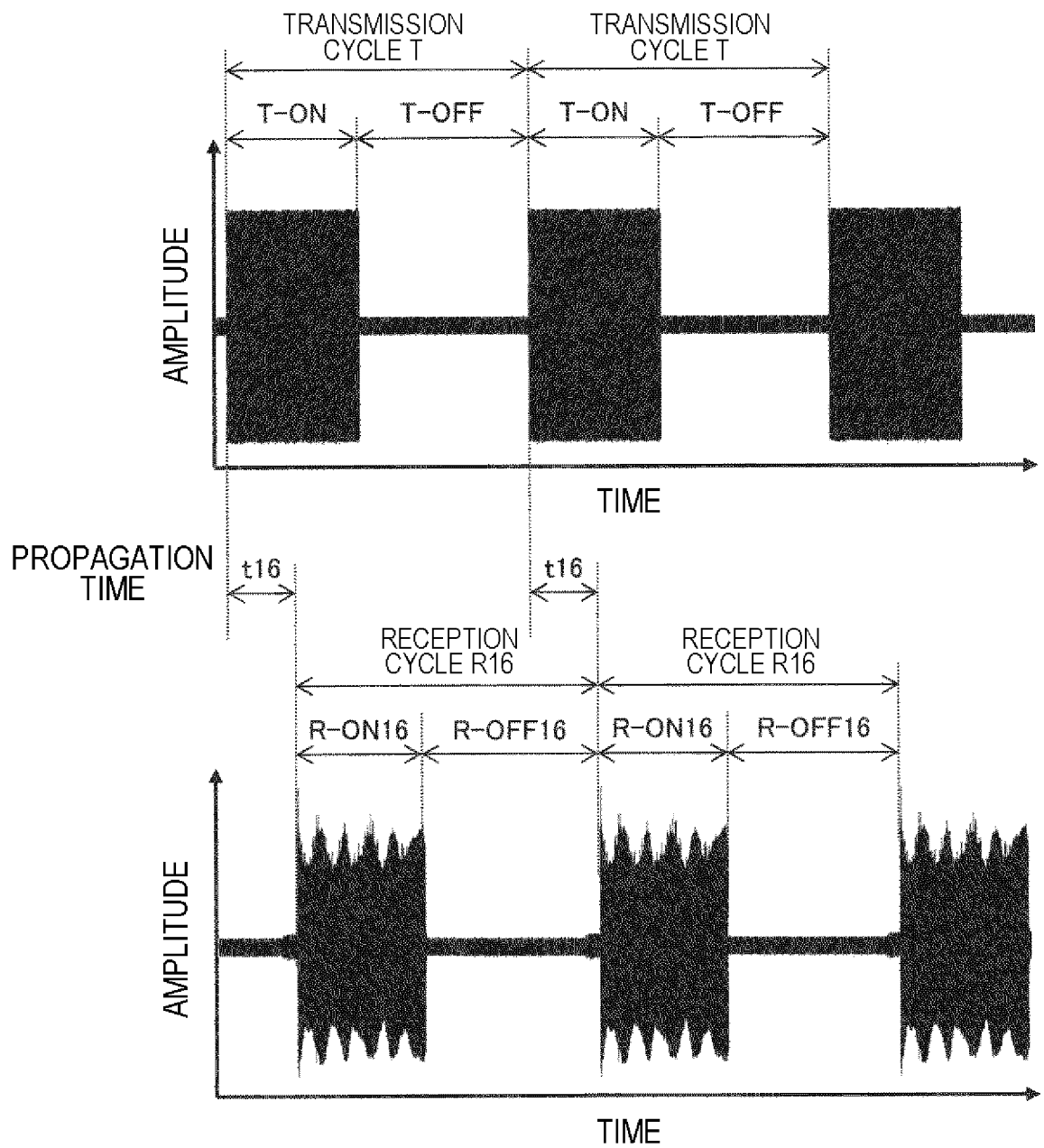
FIG. 16 is a schematic diagram explaining a transmission waveform and a reception waveform of an acoustic wave in a case (D1) described in the first embodiment.

FIG. 16 is a schematic diagram explaining the transmission waveform and the reception waveform of an acoustic wave in the case (D1) described in the first embodiment.

As illustrated in FIG. 16, the reception cycle R is detected and compared with the reception cycle RR.

Furthermore, there is a case where the length of the reception cycle R-ON16 changes. That is, it is a case where the ratio between the reception cycle R-ON16 and the reception cycle R-OFF 16 changes. This is obtained by comparing the ratio between the amplitude detection time R-ON at normal time and the amplitude non-detection time R-OFF at normal time.

Since the ratio of the time during which the propagating acoustic wave is affected by the shaking of the liquid surface changes due to an increase in liquid amount, the length (amplitude time) of the reception cycle RON16 changes among the acoustic waves propagating in the transmission cycle T-ON.

Figure 17:
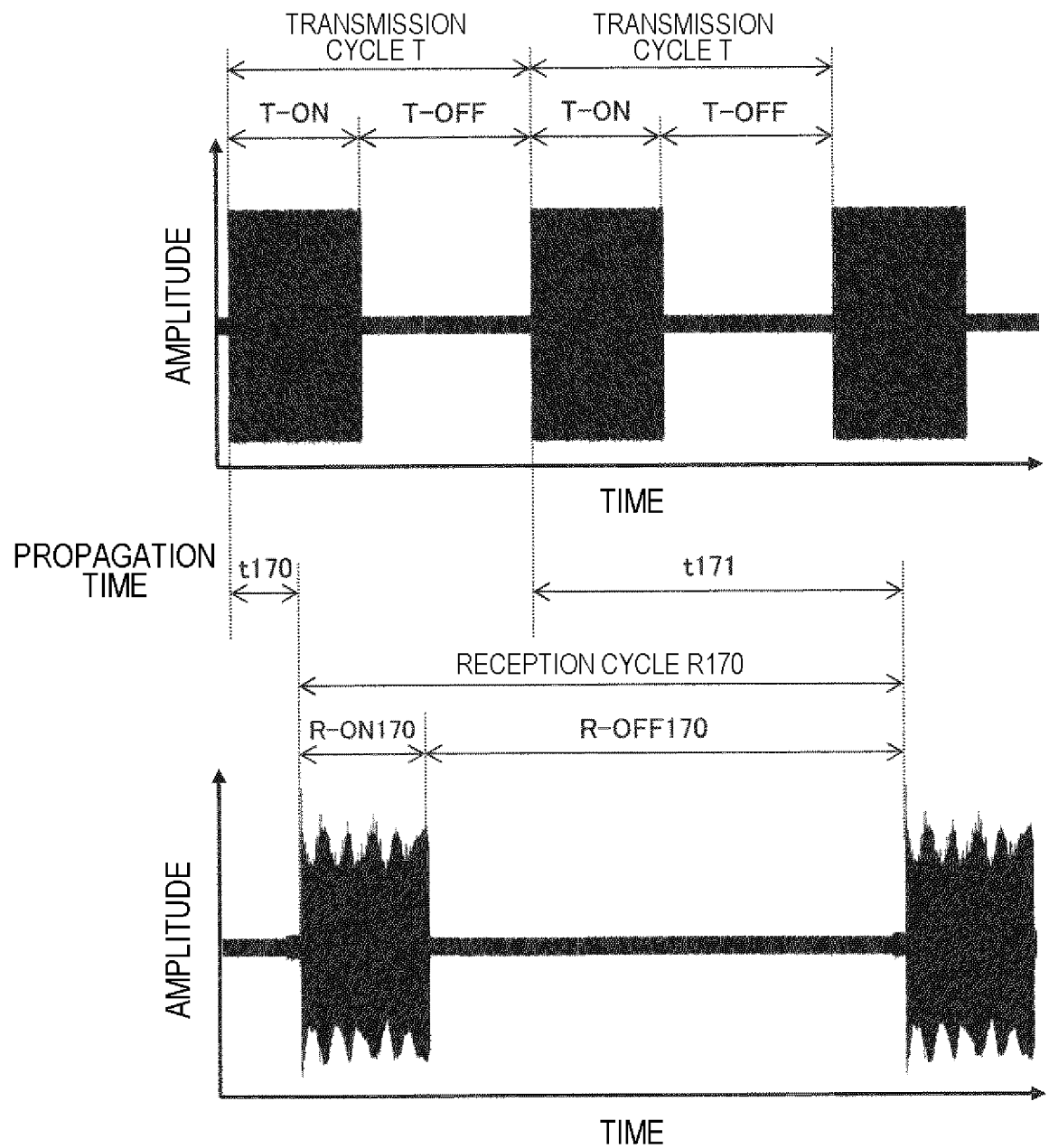
FIG. 17 is a schematic diagram explaining a transmission waveform and a reception waveform of an acoustic wave in a case (D2) described in the first embodiment.

FIG. 17 is a schematic diagram explaining the transmission waveform and the reception waveform of an acoustic wave in the case (D2) described in the first embodiment.

As illustrated in FIG. 17, the reception cycle R is detected and compared with the reception cycle RR.

Furthermore, there is a case where the length of the reception cycle R-ON170 changes. That is, it is a case where the ratio between the reception cycle R-ON170 and the reception cycle R-OFF 170 changes. This is obtained by comparing the ratio between the amplitude detection time R-ON at normal time and the amplitude non-detection time R-OFF at normal time.

Since the ratio of the time during which the propagating acoustic wave is affected by the shaking of the liquid surface changes due to a decrease in liquid amount, the length (amplitude time) of the reception cycle RON170 changes among the acoustic waves propagating in the transmission cycle T-ON.

There is also a case where the reception waveform for one cycle is not detected due to a decrease in liquid amount (see FIG. 17).

The chemical analysis apparatus described in the first embodiment includes the stirring mechanism 109 that stirs, by an acoustic wave, a sample and a reagent in the reaction vessel 102 and includes the acoustic wave generation unit 201 that generates an acoustic wave from the piezoelectric element and the acoustic wave sensor 213 that detects an acoustic wave, the photometric mechanism 110 that measures absorbance of the specimen 211 in the reaction vessel 102, and the controller 112 that controls the stirring mechanism 109, the photometric mechanism 110, and the cleaning mechanism 111.

The controller 112 includes the acoustic wave detection unit 404 that processes the detection signal detected by the acoustic wave sensor 213, the normal information memory 405 that stores normal time information, the signal strength determination unit 402 that compares the amplitude of an acoustic wave or the frequency of an acoustic wave transmitted from the acoustic wave detection unit 404 with the amplitude of an acoustic wave or the frequency of an acoustic wave stored in the normal information memory 405, the repetition cycle determination unit 403 that compares the cycle characteristic of an acoustic wave transmitted from the acoustic wave detection unit 404 with the cycle characteristic of an acoustic wave stored in the normal information memory 405, and the deterioration determination unit 401 that determines deterioration of the piezoelectric element and normality of the reaction vessel 102 based on a comparison result in the signal strength determination unit 402 and a comparison result in the repetition cycle determination unit 403.

Thus, according to the first embodiment, in particular, by also using the cycle characteristic of the acoustic wave, it is possible to quickly restore the chemical analysis apparatus in an abnormal state, it is possible to achieve not only diagnosis of deterioration of the piezoelectric element but also diagnosis of deformation or positional displacement of the reaction vessel 102 and diagnosis of normality of the liquid amount of the specimen 211 in the reaction vessel 102, and it is possible to improve the reliability of the stirring performance.

The present invention is not limited to the embodiment described above, and includes various modifications. For example, the embodiment described above has been specifically described in order to describe the present invention in an easy-to-understand manner, and is not necessarily limited to those having all the explained configurations.

REFERENCE SIGNS LIST 101 reaction disk
102 reaction vessel
103 sample turntable
104 sample cup
105 reagent bottle
106 reagent turntable
107 sample dispensing mechanism
108 reagent dispensing mechanism
109 stirring mechanism
110 photometric mechanism
111 cleaning mechanism
112 controller
113 console
114 constant temperature tank
201 acoustic wave generation unit
202 acoustic wave reflection unit
204 constant temperature water
205 drive unit
206 information
207 segment
211 specimen
213 acoustic wave sensor
214 signal unit
215 information

The invention claimed is:

1. A chemical analysis apparatus, comprising:
a stirring mechanism that stirs a sample and a reagent using an acoustic wave in a reaction vessel, generates the acoustic wave by a piezoelectric element, and includes an acoustic wave sensor that detects the acoustic wave; and
a controller that controls the stirring mechanism,
wherein the controller includes:
an acoustic wave detection unit that processes a detection signal detected by the acoustic wave sensor;
a normal information memory that stores normal time information;
a signal strength determination unit that compares an amplitude of an acoustic wave and a frequency of an acoustic wave transmitted from the acoustic wave detection unit with an amplitude of an acoustic wave and a frequency of an acoustic wave stored in the normal information memory; and
a repetition cycle determination unit that compares a cycle characteristic of an acoustic wave transmitted from the acoustic wave detection unit with a cycle characteristic of an acoustic wave stored in the normal information memory.

2. The chemical analysis apparatus according to claim 1, further comprising a deterioration determination unit that determines deterioration of the piezoelectric element and normality of the reaction vessel based on a comparison result in the signal strength determination unit and a comparison result in the repetition cycle determination unit.

3. The chemical analysis apparatus according to claim 2, wherein a cycle characteristic of the acoustic wave is a cycle of the acoustic wave.

4. The chemical analysis apparatus according to claim 2, wherein a cycle characteristic of the acoustic wave is a transmission cycle and a reception cycle.

5. The chemical analysis apparatus according to claim 2, wherein a cycle characteristic of the acoustic wave is propagation time of a reception waveform.

6. The chemical analysis apparatus according to claim 2, wherein a cycle characteristic of the acoustic wave is a ratio between an amplitude detection time and an amplitude non-detection time.

* * * * *